United States Patent Office 3,349,892
Patented Oct. 31, 1967

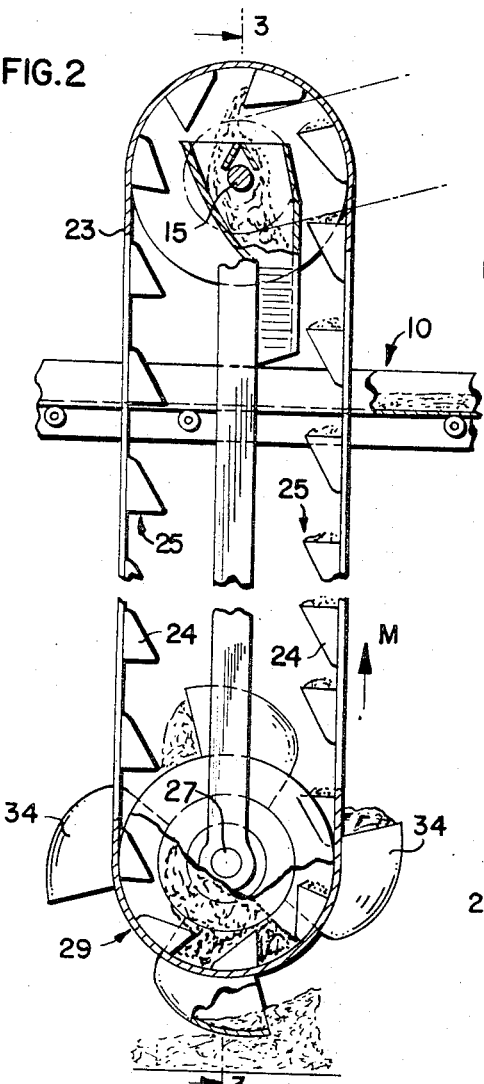
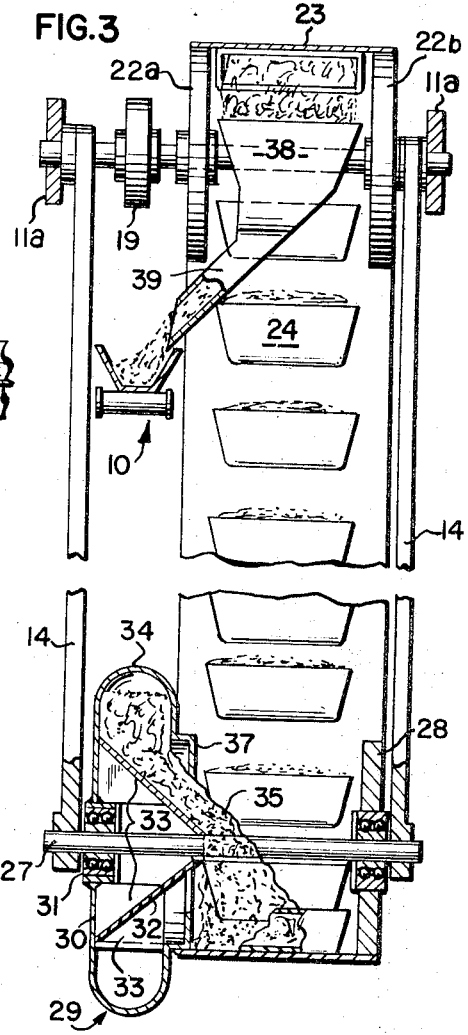
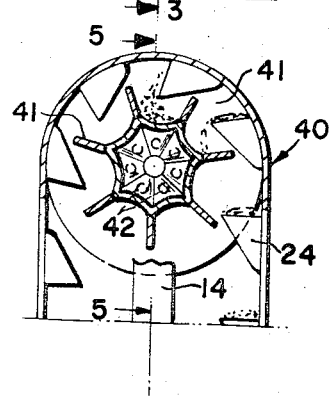
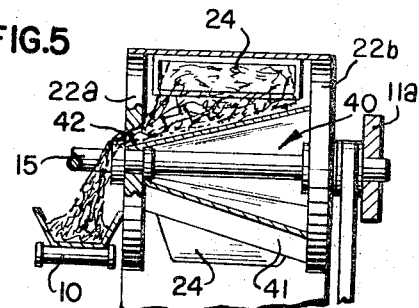
INVENTOR.
MARCEL JEAN CHARLES BARRE

3,349,892
CONVEYOR FOR HANDLING BULK MATERIALS
Marcel Jean Charles Barre, Rue d'Haubourdin, Les Peupliers 6, Faches-Thumesnil, Nord, France
Filed July 14, 1966, Ser. No. 565,141
Claims priority, application France, July 15, 1965, 24,669
6 Claims. (Cl. 198—91)

ABSTRACT OF THE DISCLOSURE

An elevating conveyor having a belt extending in a closed loop about upper and lower pairs of axially spaced coaxial pulleys and equipped with buckets mounted on the belt and open toward the inside of the loop so that the bottom portion of the belt and the lower pulleys form a downwardly and axially closed receptable. Bulk material is shoveled into the receptacle by blades mounted on one of the lower pulleys and communicating with the receptacle through openings in the pulley.

---

This invention relates to equipment for handling bulk materials such as ores and minerals, coal, cereal grains and the like, and particularly to a bucket conveyor or elevator for unloading bulk cargo from ships, silos, and similar containers.

An object of the invention is the provision of a conveyor capable of lifting large amounts of cargo quickly and with the use of relatively weak power equipment.

Another object is the provision of a conveyor capable of handling bulk material consisting of relatively large individual pieces, such as rock having a maximum dimension of about twenty inches.

A further object is the provision of a conveyor provided with shoveling or excavating equipment for picking up relatively strongly coherent bulk material.

With these and other objects in view, the invention, in its more specific aspects contemplates the use of an elongated carrier which is moved in a closed loop between vertically spaced points. Approximately cup-shaped buckets are mounted on the inside of the carrier loop. A downwardly closed receptacle is formed at the lower end of the loop in such a manner that the buckets travel through the receptacle. A rotary shovel arranged adjacent the receptacle shovels bulk material into the receptacle so that the material is carried by the buckets to the upper end of the loop where it is withdrawn from the buckets and discharged.

Additional features, other objects, and many of the attendant advantages of this invention will be readily apparent from the following description of preferred embodiments when considered with the attached drawing in which:

FIG. 2 shows a detail of the conveyor in a fragmentary enlarged view, partly in section;

FIG. 3 shows the device of FIG. 2 in front elevational section, portions being broken away to reveal internal structure;

FIG. 4 shows a modification of the apparatus of FIG. 2; and

FIG. 5 illustrates the device of FIG. 4 in front elevational section.

Figure 1:
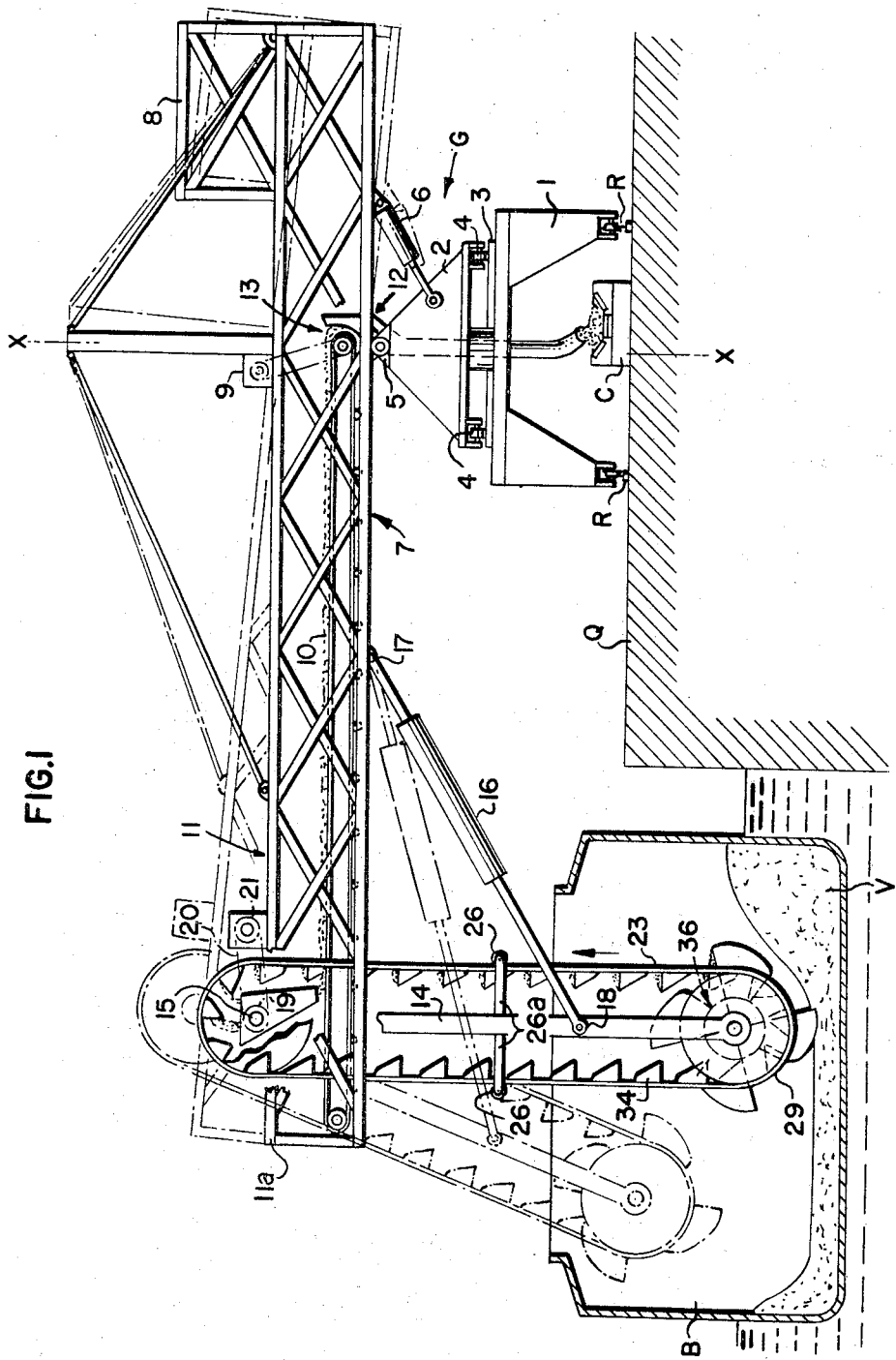
FIG. 1 shows a bulk conveyor of the invention in side elevation.

Referring now to the drawing, and initially to FIG. 1, there is seen a carriage including an elevated platform 1 and arranged on a pier Q for travel on two rails R. A heavy base 2 is supported on the platform 1 by means of circular rails 3 on the platform and wheels 4 on the base 2, which permit the base 2 to turn on the platform about a vertical axis X—X. A heavy pivot 5 secures a generally horizontal girder 7 to the base 2. The girder has two arms of unequal length, the shorter arm carrying a counterweight 8 and being connected to the base 2 by a hydraulic jack 6 for swinging movement of the girder about the horizontal axis of the pivot 5.

An electric motor 9 on the girder 7 drives a belt conveyor 10 which extends along the longer arm 11 of the girder 7. The upper strand of the belt conveyor 10 moves toward the pivot 5 and discharges conveyed material into the open top 13 of a chute 12 which extends downward to an additional conveyor C on the pier Q.

The free end of the arm 11 carries a rectangular frame essentially consisting of a horizontal shaft 15 journaled in the longitudinal top members 11a of the girder 11, two heavy bars 14 pivotally mounted on the shaft 15 and depending from the same, and a fixed axle 27 (FIGS. 2 and 3) which connects the lower ends of the bars 14. The frame may be swung in a vertically extending arc about the axis of the shaft 15 by a hydraulic jack 16 interposed between the bars 14 and the girder arm 11 by means of pivots 17, 18.

The shaft 15 is rotated during operation of the conveyor by an electric motor 21, a pulley 19 fixedly fastened on the shaft 15 being connected to the output pulley of the motor by a drive belt 20. The shaft furthermore supports two axially spaced, fixed pulleys 22a, 22b of equal size over which a heavy carrier band 23 of reinforced rubber composition is trained. The band extends in a closed loop over an idler pulley 28 rotatably mounted on the axle 27 and a pulley rim 37 on a rotary shovel 29 which is freely rotatable on the axle 27. Approximately cup-shaped buckets 24 are mounted on that side of the band 23 which constitutes the inner face of the loop. The open tops 25 of the buckets 24 are directed in the direction M of band movement in normal operation of the device. The ascending and descending strands of the band 23 are laterally guided in their paths by guide rollers 26 mounted on the bars 14 by means of cross arms 26a.

The rotary shovel 29 consists essentially of a heavy circular disc 30 mounted on the axle 27 by an anti-friction bearing 31, a hollow conical hub 32 whose base is coaxially welded to the disc 30, and shoveling tools 34 distributed over the circumference of the disc 30, four tools welded to the disc 30 being shown by way of example. Each tool 34 has a large, circumferentially directed intake opening and a discharge opening near the apex of the conical hub 32. Ribs 33 reinforce the hub 32 and the tools 34. The tools 34, which are radially aligned with the conical hub 32, are fixedly connected by the aforementioned pulley rim 37. An annular opening 35 in the rim 37 about the hub 32 provides a continuous passage through each tool 34 into a receptacle 36 defined by the lowermost portion of the band 23, the idler pulley 28 and the rim 37, as is best seen in FIG. 3. The buckets 24 travel through the receptacle 36 when the band 23 is driven by the motor 21.

A chute 38 mounted on the bars 14 subjacent the topmost portion of the band 23 in a manner not further illustrated receives the material discharged from the buckets 24 and delivers it to the belt conveyor 10 through a spout 39.

FIG. 1 illustrates the unloading of bulk cargo V from the hold of a ship B by the afore-described conveyor, generally designated G. The rotary shovel 29 is driven by the motor 21 whose movement is transmitted to the shovel by the band 23 and the pulley rim 37. Its tools 34 dig into the cargo which then slides through the opening 35 from each tool into the receptacle 36 to be lifted therefrom by the buckets 24 on the band 23 into the chute 38, for transfer to the conveyors 10 and C.

FIGS. 4 and 5 illustrate a modified discharge arrangement for the elevator on the suporting frame 14, 15, 27.

A deflector 40, which has the approximate shape of the hollow frustrum of a pyramid, is fixedly fastened between the pulleys 22a, 22b for rotation about its axis of symmetry. Vanes 41 on the outer surface of the deflector 40 define therebetween grooves or channels spaced and dimensioned to receive the buckets 24 during operation of the apparatus, as seen in FIG. 4, and sloping obliquely to the axis toward the pulley 22a. Axial openings 42 in the pulley 22a are aligned with each of the grooves for discharge of bulk material, dumped from a bucket 24 into the groove, through the pulley 22a to the conveyor 10.

Obviously, many modifications and variations are possible in the illustrated embodiment of the invention without departing from the spirit and scope of this invention. The band 23 performs a carrier function by connecting the buckets 24 into a continuous loop, and also functions as one of the elements which jointly constitute the receptacle 36. These functions may readily be separated by replacing the band by cables or chains connecting the buckets 24, and by an apron suspended from the axle 27 which forms the bottom of the receptacle 36 between the idler pulley 28 and the pulley rim 27. Numerous other variations will readily suggest temselves to those skilled in the art.

It is therefore, to be understood that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:
1. An elevator arrangement comprising, in combination:
  (a) a support;
  (b) two pairs of coaxially rotatable pulley members mounted on said support in vertically spaced relationship;
  (c) elongated carrier means trained over said pulley members in a closed loop having two vertically spaced portions respectively adjacent said pairs of pulley members;
  (d) drive means for moving said carrier means in said loop;
  (e) a plurality of approximately cup-shaped buckets mounted on said carrier means and having respective openings directed toward the inside of said loop;
  (f) means defining a downwardly closed receptacle at the lower one of said loop portions, said openings communicating with said receptacle during movement of said carrier means in said loop;
  (g) rotary shovel means adjacent said receptacle for shoveling a bulk material into said receptacle; and
  (h) discharge means for withdrawing said bulk material from said buckets at the higher one of said loop portions,
    (1) said discharge means including a deflector member having an axis, said deflector member being mounted between the pulley members adjacent said higher loop portion and tapering in an axial direction from one toward the other of the last-mentioned pulley members,
    (2) a plurality of vanes angularly spaced on said deflector member about the axis thereof, said vanes defining axially extending channels therebetween,
    (3) said other pulley member being formed with openings respectively communicating with said channels.

2. An elevator arrangement comprising, in combination:
  (a) a support;
  (b) two pairs of pulley members mounted on said support in vertically spaced relationship, each pair having a common axis and being axially spaced;
  (c) an elongated carrier band trained over said pulley members in a closed loop and having two vertically spaced portions respectively adjacent said pairs of pulley members,
    (1) the lower pair of pulley members and the lower portion of said band jointly defining a receptacle on the inside of said loop, said receptacle being substantially closed in a downward direction and in the direction of the common axis of said lower pair;
  (d) a plurality of buckets mounted on said band and open toward said inside;
  (e) drive means for moving said band in said loop;
  (f) rotary shovel means adjacent said receptacle for shoveling a bulk material into the same; and
  (g) discharge means for withdrawing said bulk material from said buckets at the higher one of said loop portions.

3. An arrangement as set forth in claim 2, wherein said shovel means includes a plurality of shoveling tools fixedly fastened to one pulley of said lower pair and angularly spaced from each other about said common axis of said lower pair, each tool defining a passage therethrough communicating with said receptacle for gravity discharge of material from said tool to said receptacle.

4. An elevator arrangement as set forth in claim 2, wherein said band drivingly engages one pulley member of said lower pair, and motion transmitting means interposed between said one pulley member and said shovel means for rotating the shovel means in response to movement of said band in said loop.

5. An arrangement as set forth in claim 2, wherein said discharge means include a chute subjacent the upper one of said loop portion.

6. An arrangement as set forth in claim 2, further comprising a carriage; means for guiding said carriage in a horizontally extending path; a horizontally extending arm having one end portion secured to said carriage and another end portion remote from said carriage; said support being pivotally mounted on said arm; and means for moving said support on said arm in a vertically extending arc; said drive means including means for rotating one of the pulley members of the upper pair.

References Cited

UNITED STATES PATENTS

| | | | |
|---|---|---|---|
| 1,804,287 | 5/1931 | Spry | 198—126 |
| 2,311,084 | 2/1943 | Redler | 214—14 X |
| 3,285,385 | 11/1966 | Langner | 198—9 |

FOREIGN PATENTS 23,933  6/1960  Germany.

EVON C. BLUNK, Primary Examiner.

EDWARD A. SROKA, Examiner.